United States Patent

Hosokawa et al.

[11] Patent Number: 6,061,149
[45] Date of Patent: *May 9, 2000

[54] COMMUNICATION SYSTEM CAPABLE OF CHANGING COMMUNICATION PROTOCOL

[75] Inventors: Yuko Hosokawa, Kawasaki; Hiroshi Nobuta, Yamato, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/794,093

[22] Filed: Feb. 3, 1997

[30] Foreign Application Priority Data

Feb. 6, 1996 [JP] Japan .................. 8-019986

[51] Int. Cl.[7] .................. H04N 1/32
[52] U.S. Cl. .................. 358/442; 358/443
[58] Field of Search .................. 358/442, 498, 358/434, 444; 395/681, 285, 286

[56] References Cited

U.S. PATENT DOCUMENTS

| | | | |
|---|---|---|---|
| 5,452,420 | 9/1995 | Engdahl et al. | 395/285 |
| 5,528,385 | 6/1996 | Manning | 358/442 |
| 5,661,569 | 8/1997 | Yamanaka | 358/442 |
| 5,684,605 | 11/1997 | Tezuka et al. | 358/442 |
| 5,684,607 | 11/1997 | Matsumoto | 358/442 |
| 5,696,606 | 12/1997 | Sakayama et al. | 358/442 |
| 5,719,686 | 2/1998 | Sakamoto et al. | 358/444 |
| 5,734,704 | 3/1998 | Matsueda et al. | 358/434 |
| 5,748,915 | 5/1998 | Iijima | 395/285 |
| 5,751,449 | 5/1998 | Nobuta | 358/498 |

*Primary Examiner*—Yon J. Couso
*Attorney, Agent, or Firm*—Fitzpatrick, Cella, Harper & Scinto

[57] ABSTRACT

A communication system in which if the connection between a facsimile apparatus and a host computer such as a PC is confirmed, the facsimile apparatus obtains information on whether or not the host computer is in ready status, as operation information of the host computer. If the host computer is not connected to the facsimile apparatus or it does not in operable state, otherwise the host computer operates but it is in busy status, the facsimile apparatus changes a negotiation protocol between the facsimile apparatus and another facsimile apparatus as the communication destination.

31 Claims, 22 Drawing Sheets

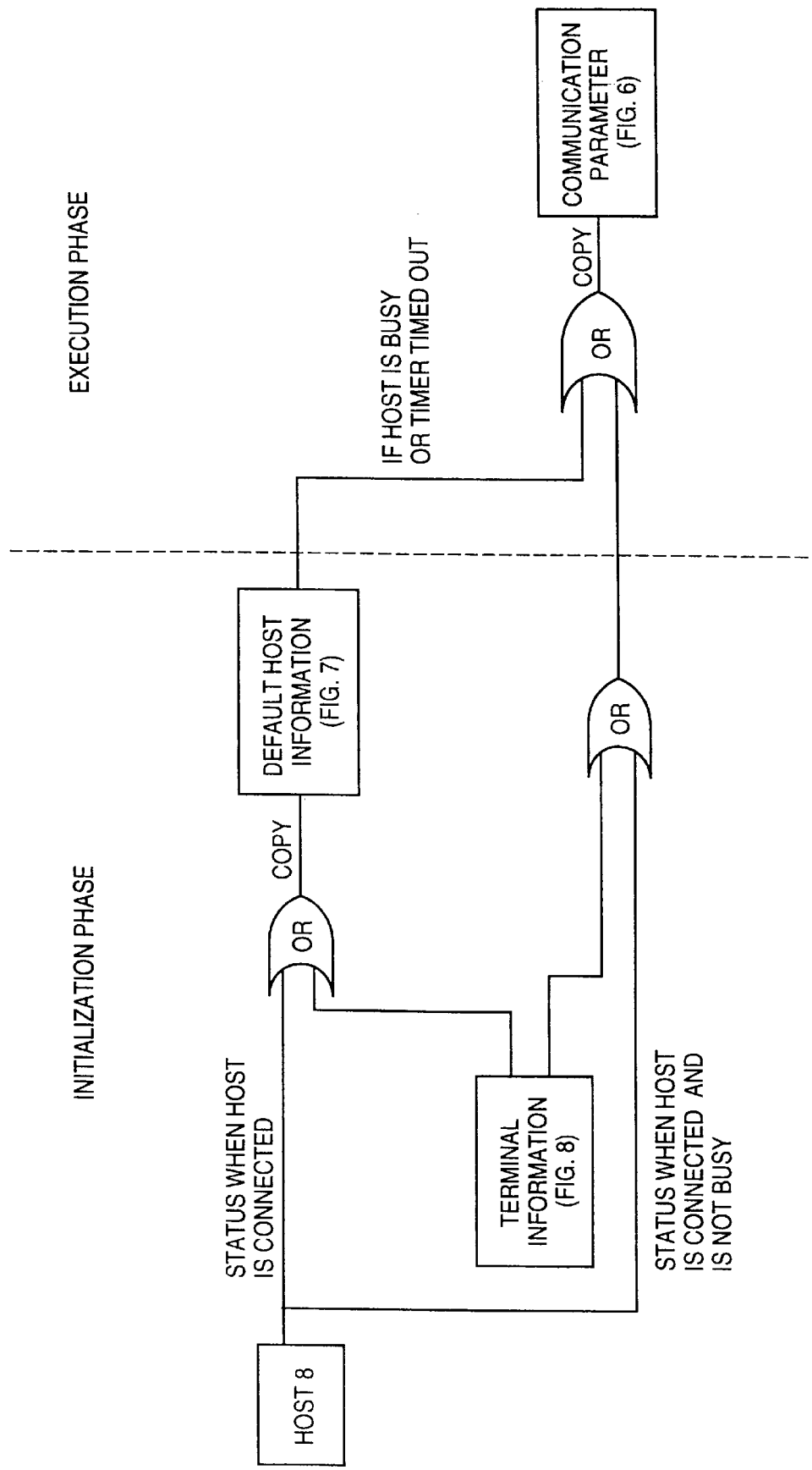

CDCL (Command Document Capability List)

— REFER TO NON-STANDARD CAPABILITIES

RDCLP (Response Document Capability List Positive)

— REFER TO NON-STANDARD CAPABILITIES

FIG. 24

CSCC (Command Session Change Control)

| 15 | CSCC |
|----|------|
| 00 | L1   |

FIG. 25

RSCCP (Response Session Change Control Positive)

| 16 | RSCCP |
|----|-------|
| 00 | L1    |

COMMUNICATION SYSTEM CAPABLE OF CHANGING COMMUNICATION PROTOCOL

BACKGROUND OF THE INVENTION

This invention relates to a communication apparatus which transmits/receives information with a destination via a communication line and transfers/receives information with a host computer connected as an external device, and to a communication control method therefor.

In a conventional communication system having a communication terminal connected to a host computer, communication is performed when an origination instruction is received from the host computer.

FIG. 26 is a flowchart showing a process procedure for processing an incoming-call by the conventional communication system. FIG. 27 is a flowchart showing a calling process procedure by the communication system.

In case of call origination, when a calling request command is received from the host computer (step S228 in FIG. 27), the communication terminal performs a predetermined communication protocol (step S229) based on calling information received with the command.

In case of incoming-call terminating, the communication terminal performs the communication protocol with a destination side terminal (step S221 of FIG. 26), and transmits/receives data to/from the calling-side terminal. When the communication has been completed, the communication terminal sends a data-transfer start command to the host computer, starts a timer and waits for a response from the host computer (step S222). If a response has been received from the host computer (YES at step S223), the communication terminal transfers the data which was received from the originator side, to the host computer (step S224). The data is processed in the host computer.

However, if no response is received from the host computer (NO at step S223), and the response-waiting timer has timed out (YES at step S226), the received data is deleted or discarded (step S227).

If the communication terminal does not connect to any host computer and no response has been received, or in a case where the communication terminal connects the host computer but it is in busy status due to execution of another application, and no response is received, the communication cannot be completed even though an incoming call has been received. Even if the communication is established, it is probable that the communication terminal cannot process the received information properly. Accordingly, in such cases, the established communication link must be disconnected, or the data received from a destination terminal is not used and deleted, thus resulting in a waste of both communication and information.

SUMMARY OF THE INVENTION

The present invention has been made in consideration of the above drawbacks.

An object of the present invention is to provide a communication system and a communication apparatus which is connectable with an external device such as a host computer, and which performs data communication with another communication apparatus, and a communication control method for controlling the communication.

According to the present invention, the communication is performed such that communication performance is not influenced by the connection status between the communication apparatus and the external device and the operational status of the external device.

Another object of the present invention is to provide a communication system, a communication apparatus and a communication control method which confirms the operative connection (including a physical connection) with the external device, then if the connection is confirmed, obtains operation information of the external device, and changes the communication protocol based on the confirmed connection status and the obtained operation information.

According to an aspect of the present invention, the change in the protocol is made by changing a communication parameter which defines a characteristic of the protocol.

According to an aspect of the present invention, said protocol includes a negotiation procedure with the destination device, and the negotiation procedure is changed.

Another object of the present invention is to provide a communication system, a communication apparatus and a communication control method which obtains information indicating whether or not the external device is in ready status, as the operation status of the external device, and if the external device is in ready status, does not change the communication protocol.

Another object of the present invention is to provide a communication system, a communication apparatus and a communication control method which obtains information indicating whether or not the external device is operable, as the operation status of the external device, and if the external device is not operable, changes the communication protocol.

Another object of the present invention is to provide a communication system, a communication apparatus and a communication control method which performs an alternative reception for the external device, if the external device is not operable but there is a possibility that the external device will become operable in near future, thus further reducing waste of communication.

Another object of the present invention is to provide a communication system, a communication apparatus and a communication control method which replaces the operation information of the external device with operation information of the communication apparatus if the communication apparatus is not operatively connected to the external device, thus further reducing waste of communication with the other communication apparatus.

Another object of the present invention is to provide a communication apparatus which can function as a stand-alone communication apparatus if the communication apparatus is not operatively connected to the external device.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3B is a block diagram illustrating how communication parameters for the communication terminal are developed in accordance with host status;

FIG. 24 is an example of a CSCC (Command Session Change Control) command;

FIG. 25 is an example of an RSCCP (Response Session Change Control Positive) command;

DETAILED DESCRIPTION OF THE INVENTION

Preferred embodiment of the present invention will now be described in detail in accordance with the accompanying drawings.

Figure 1:
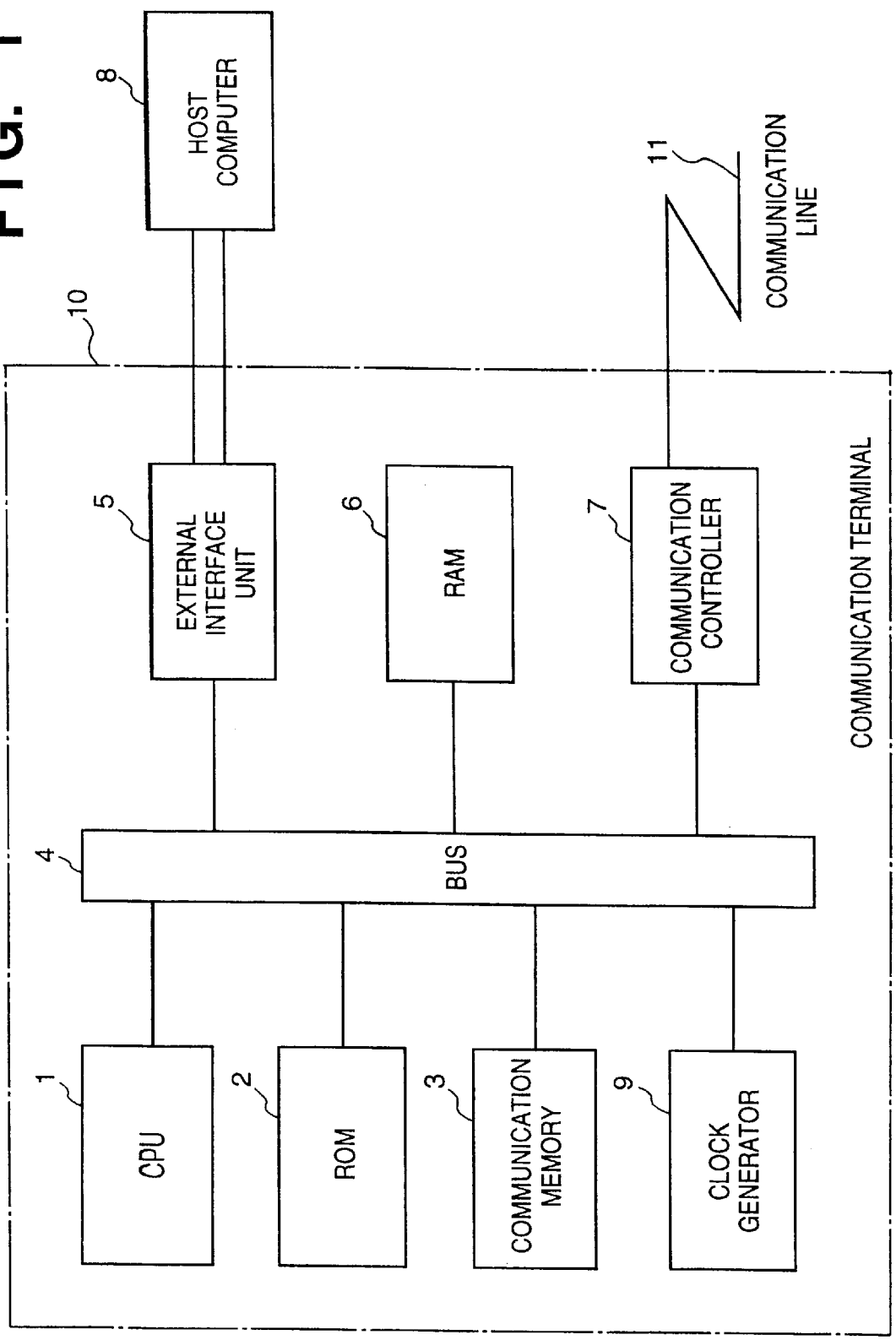
FIG. 1 is a block diagram showing the construction of a communication terminal according to an embodiment of the present invention.

FIG. 1 is a block diagram showing the construction of a communication terminal according to an embodiment of the present invention. Referring to FIG. 1, reference numeral 10 denotes a main body of communication terminal; 1, a CPU which controls the overall communication terminal 10; 2, a ROM for storing control programs and etc. for the CPU 1; 3, a communication memory for storing communication data and the like; 5, an external interface for interfacing between the terminal 10 and a host computer 8 connected thereto as an external device; 6, a RAM for storing control information for the CPU 1; 7, a communication controller which connects a communication line 11 and which controls communication by the communication terminal 10; 9, a clock generator which generates clocks necessary for the operations of the respective elements; and 4, a CPU bus electrically connecting the above elements with each other.

The host computer 8 is connected to the terminal 10 in an operable manner, such as via communication bus or opto-coupling.

Next, parameters necessary for communication by the communication terminal 10 according to the present embodiment will be described. The parameters are stored in a communication-parameter storage area in the ROM 2 or in the RAM 6, as will be described below.

Figure 6:
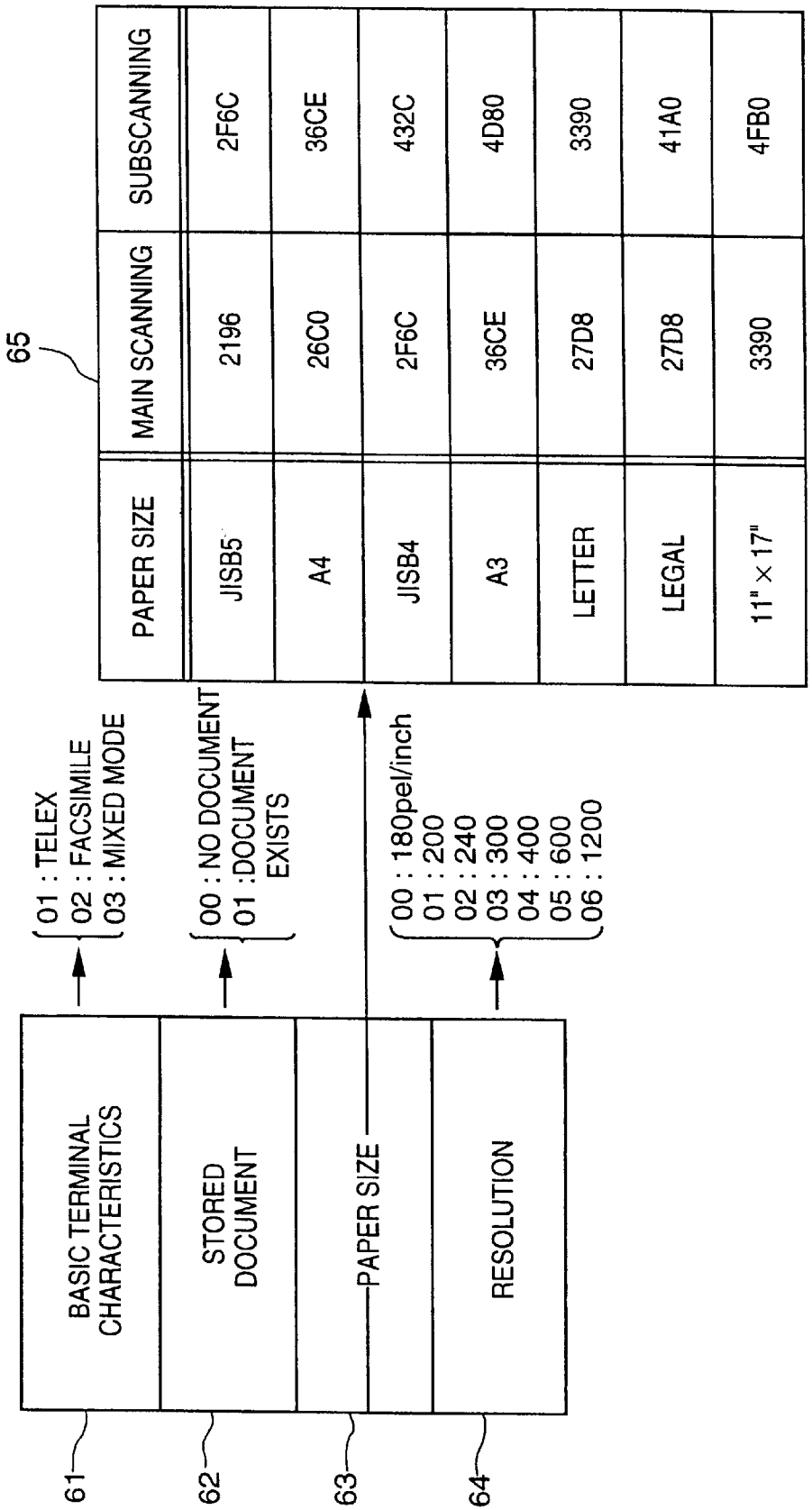
FIG. 6 is an example of the structure of a "communication-parameter" storage area.

FIG. 6 shows the structure of the "communication-parameter" storage area provided in the communication terminal 10. Referring to FIG. 6, a "basic terminal-characteristic" area 61 stores a parameter indicating the basic characteristic of the communication terminal. The basic terminal characteristic includes a teletex mode, a facsimile mode or a mixed mode. "Stored-document" area 62 stores a parameter indicating whether the host computer 8 has any document to be polled. "Paper size" area 63 stores a parameter designating the size of paper that the communication terminal handles. Paper sizes which can be handled are listed in a table 65 in FIG. 6. "Resolution" 64 area stores a parameter indicating the resolution that the communication terminal can handle.

Note that these parameters are set upon a communication, and used in communication negotiation with a communication-destination terminal.

Figure 7:
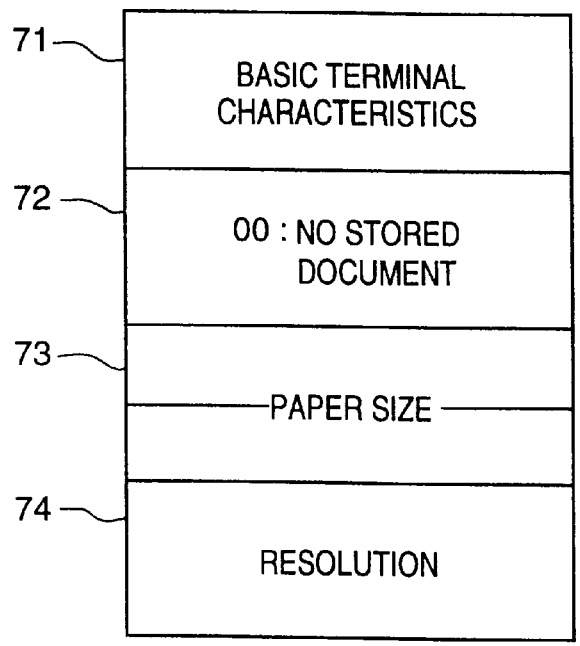
FIG. 7 is an example of the structure of a "default host-information" storage area.
Figure 8:
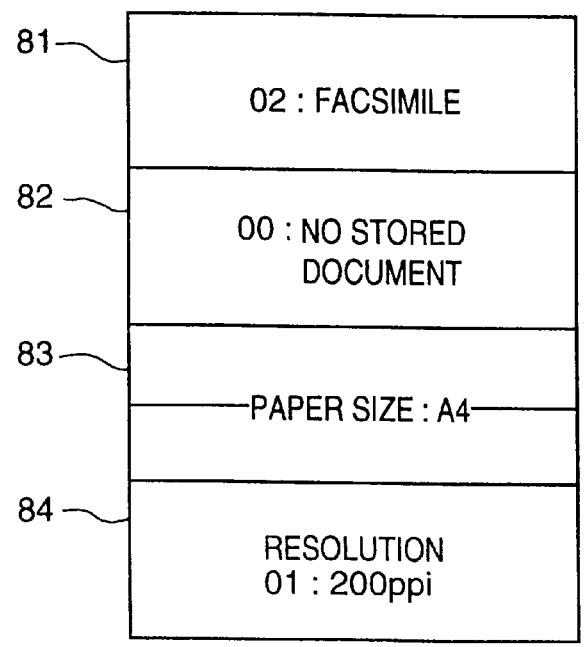
FIG. 8 is an example of the structure of a "terminal information" storage area.

FIG. 7 shows the structure of a "default host-information" storage area provided in a RAM of the terminal 10. The parameters in this storage area define parameters used by a communication application program executed by the host computer 8 for communication with the communication terminal 10. FIG. 8 shows the structure of a "terminal-information" storage area provided in the communication terminal 10. The parameters in this storage area define the communication protocol that the communication terminal 10 performs as a stand-alone terminal if the terminal is not connected to the host computer.

Thus, FIGS. 7 and 8 illustrate an example of the parameters 61–64 illustrated in FIG. 6. FIG. 7 illustrates parameters 71–74 which can be dealt with by the host computer 8, while FIG. 8 illustrates parameters 81–84 which can be dealt with by the communication terminal 10.

Figure 9:
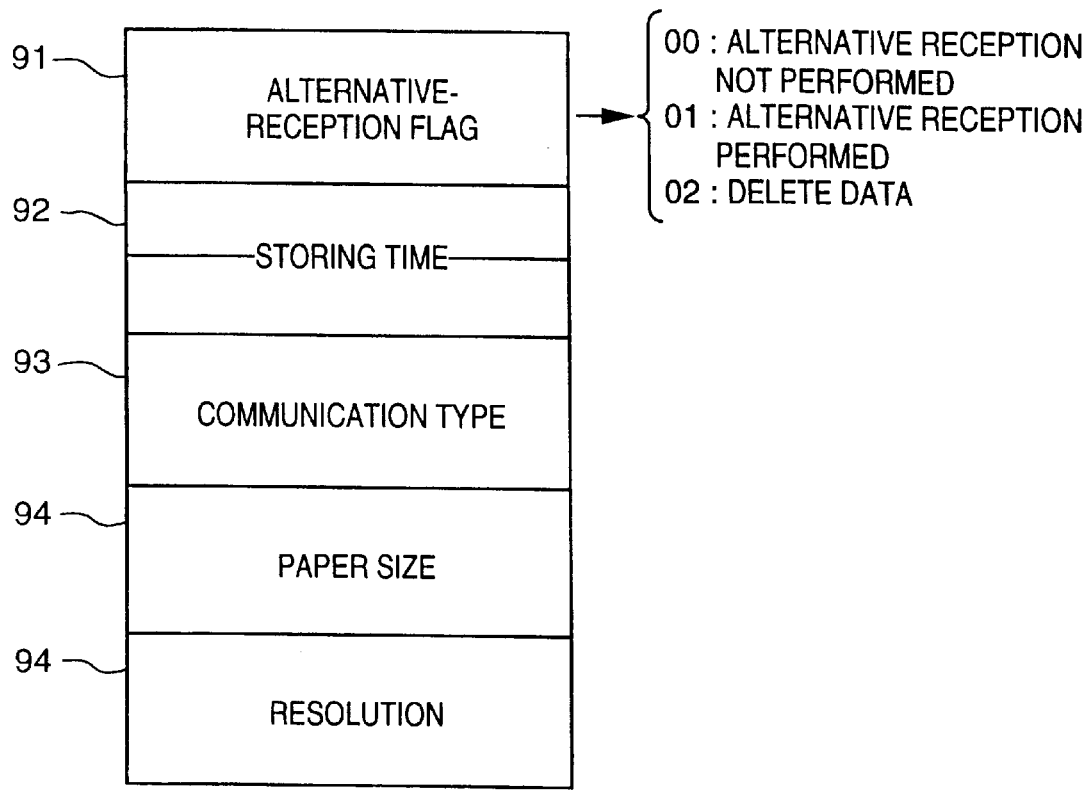
FIG. 9 is an example of the structure of an "alternative-reception information" storage area.

FIG. 9 shows the structure of an "alternative-reception information" storage area. Referring to FIG. 9, "alternative-reception flag" area 91 stores an alternative reception flag. The flag indicates whether alternative reception has been performed.

Figure 10:
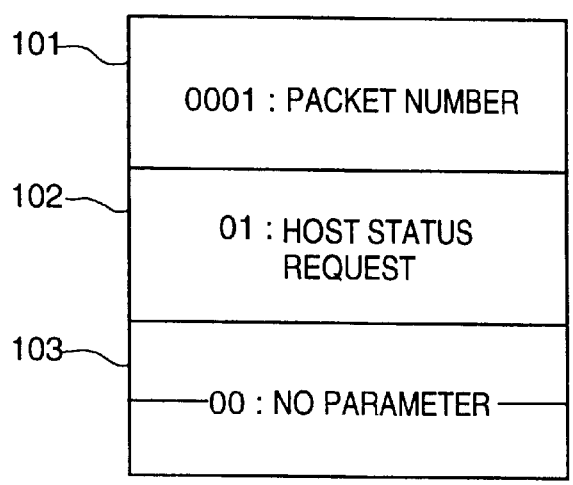
FIG. 10 is an example of the structure of a host-status request command.

FIG. 10 illustrates a format of a host-status request command which is transmitted from the communication terminal 10 to the host computer 8. Numeral 101 denotes a number (exemplified as "0001") of the packet of the command, and 102 denotes a type (exemplified as "01" indicating a host status request) indicating the content of the packet. Field 103 indicates whether parameters follow, with "00" indicating that no parameters followed.

Figure 2:
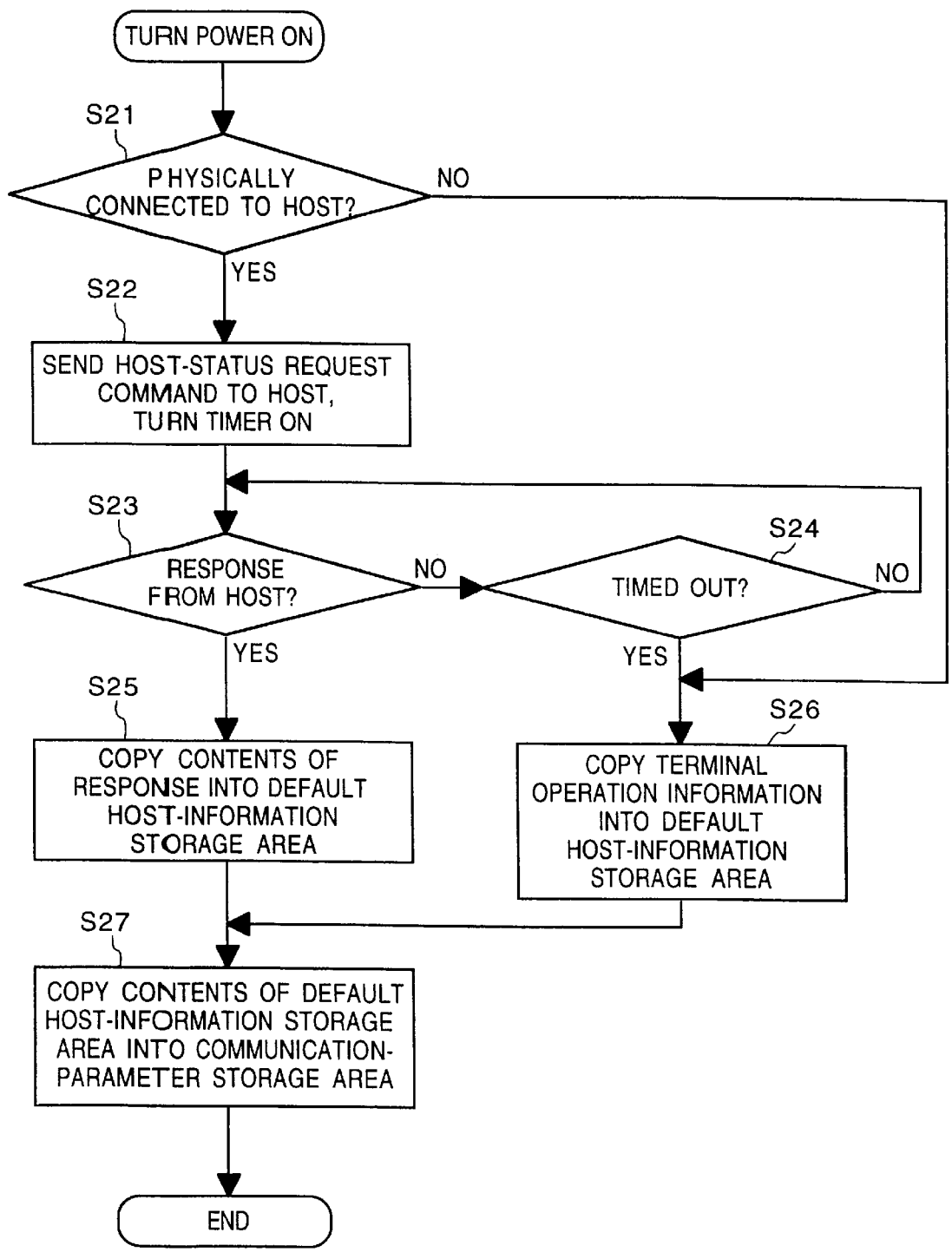
FIG. 2 is a flowchart showing the operation of the communication terminal when power is supplied.

FIG. 2 is a flowchart showing initialization of the communication terminal 10 when power is supplied to the terminal.

When the power of the communication terminal 10 is turned on, the communication terminal 10 confirms whether or not the communication terminal 10 is operatively connected to the host computer 8 (step S21). If YES, i.e., it is determined at step S21 that the communication terminal 10 is operatively connected to the host computer 8, the terminal sends a status request command to the host computer 8, and starts a timer for waiting for a response from the host computer 8 (step S22).

Figure 11:
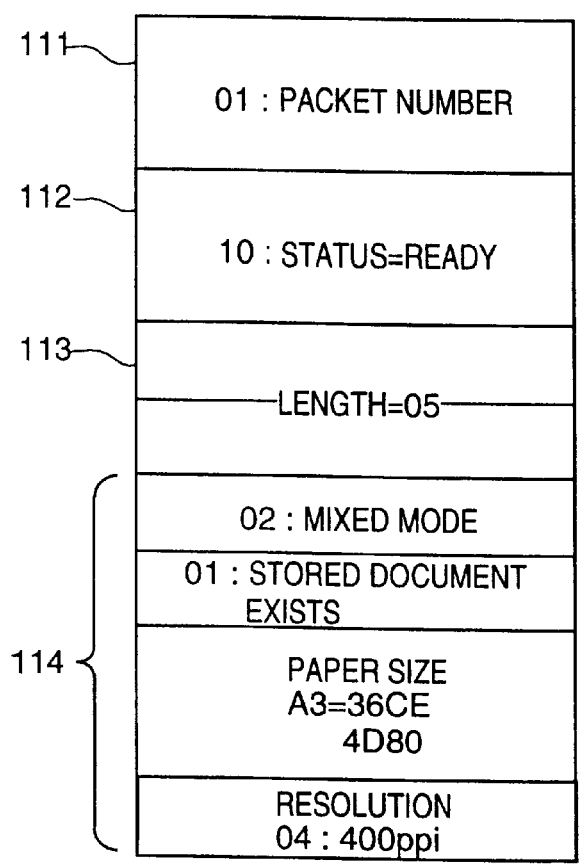
FIG. 11 is an example of the structure of "host status information"

FIG. 11 illustrates a format of host status information by which the host computer 8 responds to a command shown in FIG. 10. In FIG. 11, numeral 111 denotes a field storing a number ("exemplified as "01") of the packet, and 112 denotes a field storing the response status (exemplified as "10" to mean "ready"). Field 113 indicates a length of information which follow, and fields 114 store information on application programs which are executable as well as various information on the status. The top field 114 represents that the "mixed mode" is in a ready condition, the second field 114 indicates that a stored document exists, and the third field 114 indicates that the paper size is set to A3 and the resolution is set to 400 dpi.

If the host computer 8 is in a ready (operable) status, host status information as shown in FIG. 11 is returned to the communication terminal 10. The host status information includes such parameters as application information (e.g., information as to whether text information can be received or not, paper size, resolution etc.) of the application program.

Figure 12:
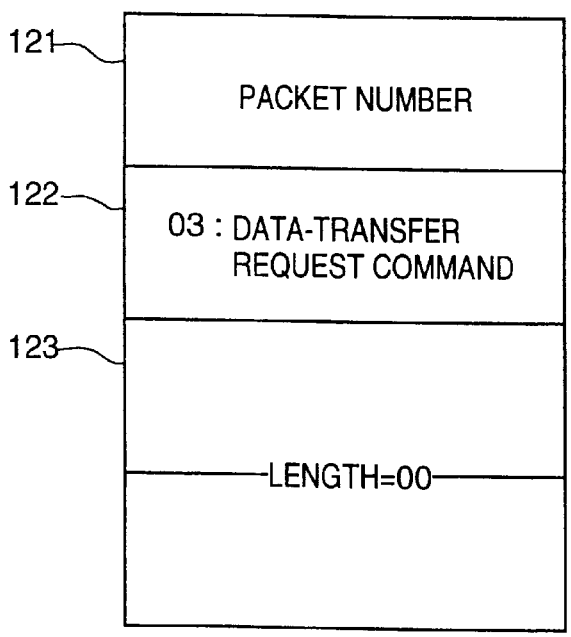
FIG. 12 is an example of the structure of a data-transfer request command.

If a response has been received from the host computer 8 (YES at step S23), the communication terminal FIG. 12 illustrates a format of a data transfer request which is transmitted from the communication terminal 10. In FIG. 12, a field 121 stores a packet number. Field 122 stores the value "03" indicating that the packet is a data transfer request command. Field 123 stores the length "00", which indicates that no further data is included in this packet. 10 copies the returned data (the content of the response as illustrated in FIG. 11) into the "default host-information" storage area (in FIG. 7) of the RAM 6 (step S25).

On the other hand, if the communication terminal 10 is not operatively connected to the host computer 8, or no response has been received from the host computer 8 and a response-waiting time set in the timer has been out (YES at step S24), the communication terminal 10 is allowed to determine that the host computer 8 is not in ready status. Then, operation information which specifies the characteristic of the terminal 10 and was stored in the "terminal information" storage area (in FIG. 8) is copied into the "default host information" storage area (step S26). Note that the information in the "terminal information" storage area is stored in the ROM 12 as initial value parameters of the communication terminal 10 when the terminal 10 is powered on.

At step S27 where the control has proceeded from step S25 or S26, the contents of the "default host information" storage area are copied in the "communication parameter" storage area illustrated in FIG. 6. Where the control has proceeded from step S26, that is the host 8 was not ready, "communication parameters" stored in the area are used for the terminal 10.

Figure 3A:
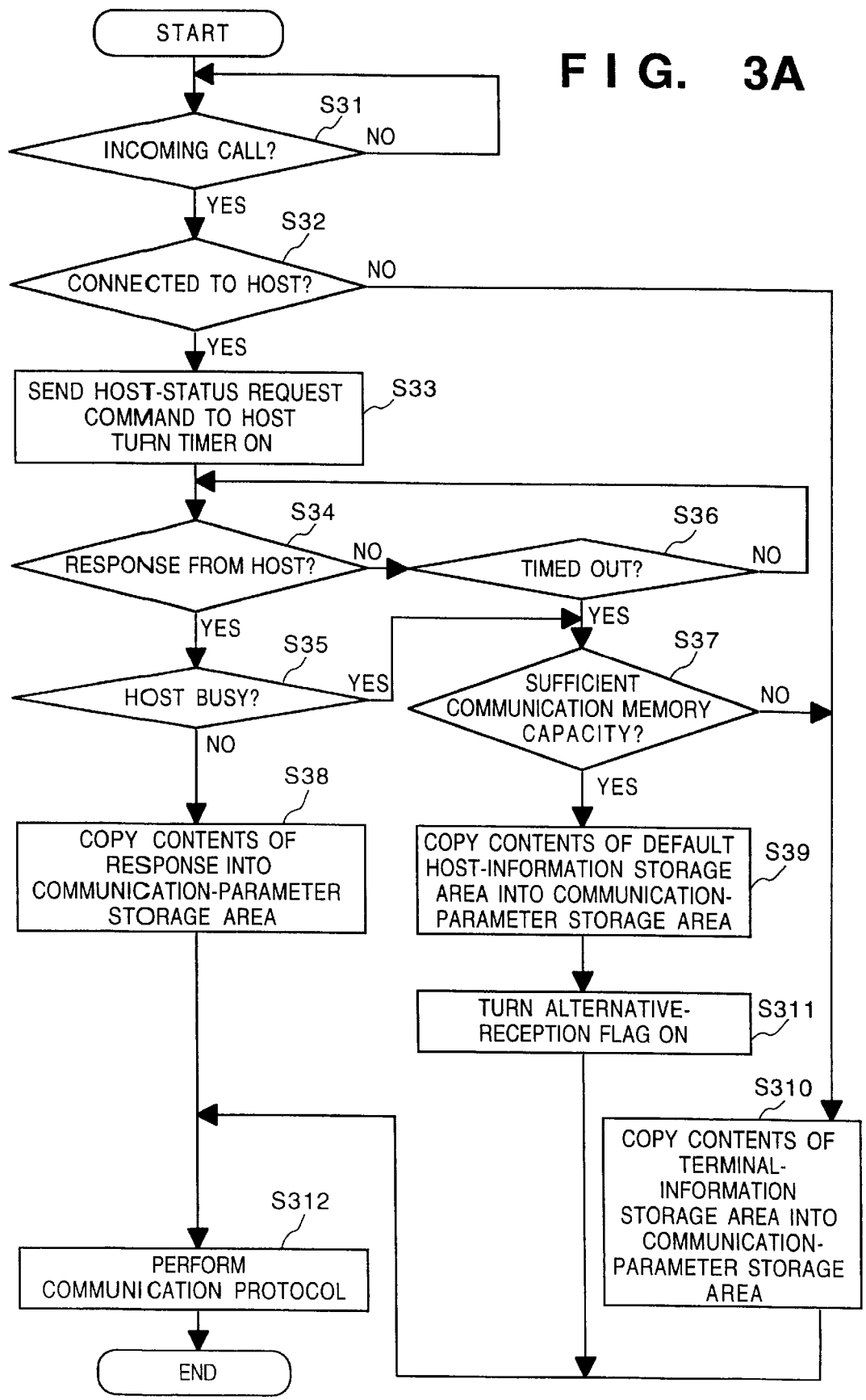
FIG. 3A is a flowchart showing a procedure of processing an incoming-call by the communication terminal.

FIG. 3A is a flowchart showing a control procedure of incoming-call processing executed by the communication terminal 10. FIG. 3B is a block diagram illustrating how communication parameters for the communication terminal 10 are developed in accordance with the flowcharts of FIGS. 2 and 3A. Thus, as shown in FIG. 3B, the overall control procedure is divided into "initialization" and "execution" phases. This initialization phase is performed by the control procedure illustrated in FIG. 2, while the execution phase is performed by the control procedure illustrated in FIG. 3A. A detailed description of the control procedures is given below in connection with FIGS. 2 and 3A.

When an incoming call has been received (YES at step S31) from the communication destination, the communication terminal 10 confirms the host computer 8. More specifically, it is determined at step S32 whether or not the communication terminal 10 is operatively connected to the host computer 8. If YES, the terminal 10 sends a host-status request command (see FIG. 10) to the host computer 8, and starts the timer at step S33. At step S34, the terminal 10 waits for a response from the host computer 8.

Thus, if it is confirmed that the communication terminal 10 connects the host computer 8 and a response from the host computer 8 has been received (YES at step S34), it is determined whether or not the host computer 8 is in busy status, based on host status information included in the response (step S35). If the host computer 8 is in ready status, the contents of the host status information are copied in the "communication-parameter" storage area (step S38). The communication terminal 10 outputs a data-transfer request command as shown in FIG. 12, or a data-transfer start command as shown in FIG. 14, to the host computer 8, so as to cause the host computer 8 to prepare for data reception or data transmission.

Figure 14:
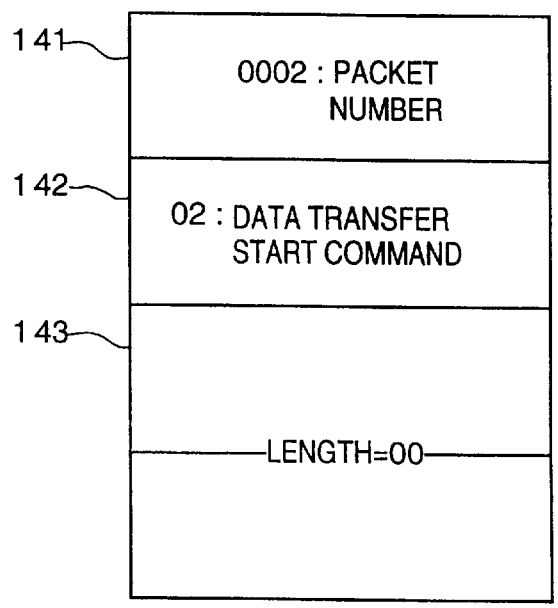
FIG. 14 is an example of the structure of a data-transfer start command.

FIG. 14 illustrates a format of aa data transfer start command which is transmitted from the communication terminal 10 to the host computer 8. Field 141 stores a packet number (=0002) of the packet, while field 142 stores a type of information included in this frame packet. The "02" stored in field 142 indicates that it contains the data transfer start command. Field 143 stores the length (here=0) of the packet.

On the other hand, in a case where the physical connection between the communication terminal 10 and the host computer 8 is confirmed but the response-waiting timer has timed out (YES at step S36), otherwise if the host computer 8 has returned a "busy" status as its response since the host computer 8 has been executing another application program (YES at step S35), the communication terminal 10 determines that the host computer 8 is currently not in ready status but will become in ready status in a predetermined period.

Then, the communication terminal 10 detects the amount of available storage capacity of the communication memory 3 (step S37). If the communication memory 3 has an available capacity of a predetermined amount or more, the contents of the default host information storage area, which were stored in the initialization processing (See FIG. 2), are copied into the "communication parameter" storage area (FIG. 6) in step S39. At step S311, the "alternative-reception flag" (See FIG. 9) indicating that an alternative reception will be executed is turned on.

However, if it is determined at step S37 that the communication memory 3 has no sufficient storage capacity, or if it is determined at step S32 that the communication terminal 10 does not operatively connect the host computer 8, the communication terminal 10 determines that the communication function of the host computer 8 cannot be achieved. Then, the contents of the "terminal-information" storage area (See FIG. 8) are set to the "communication-parameter" storage area (FIG. 6) in step S310.

In these manners, after the communication parameters have been set, the communication procedure to be described later is performed (step S312).

FIG. 3B summary illustrates how the "communication parameters" that define communication protocol between the terminal 10 and the destination terminal are determined.

Next, the communication procedure by the communication terminal 10 according to the present embodiment will be described. Note that description will be made as a case of G4 facsimile communication.

Figure 16:
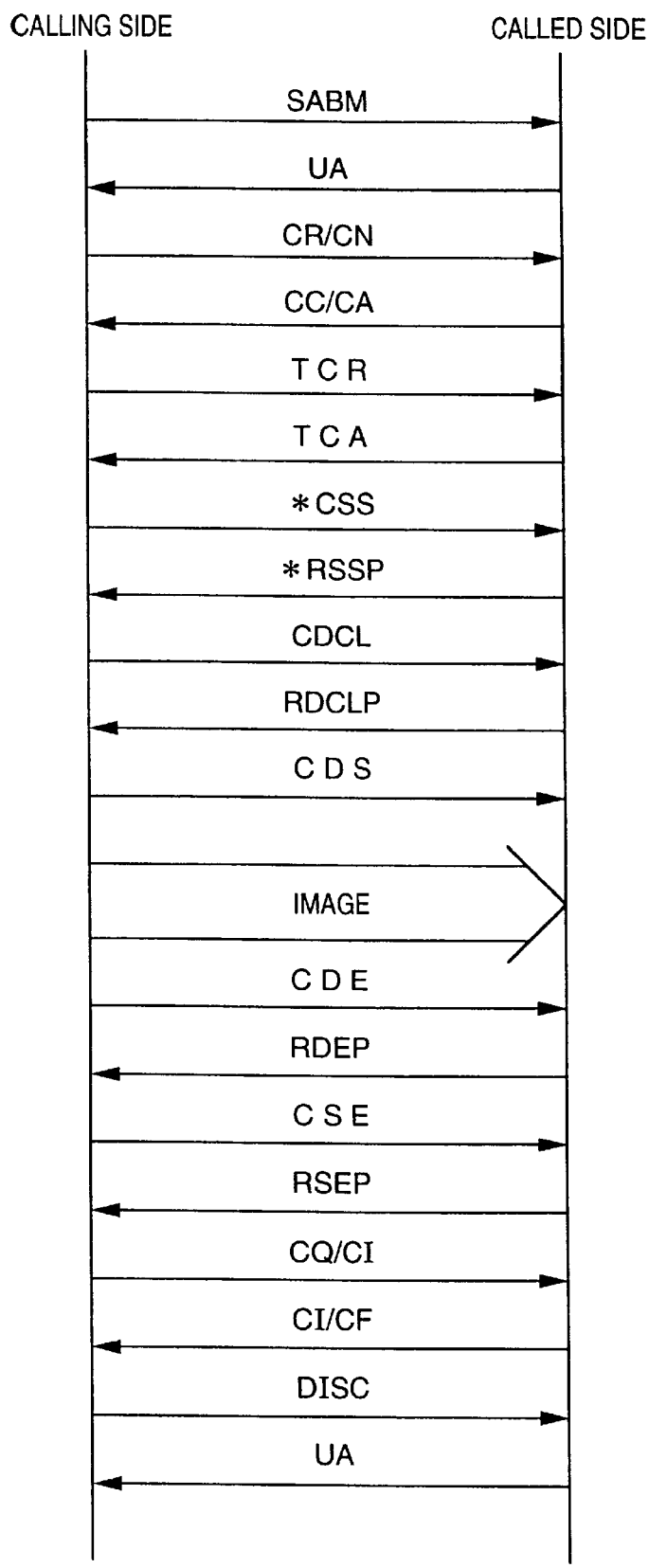
FIG. 16 is a sequence diagram showing a normal G4 facsimile transmission protocol.
Figure 18:
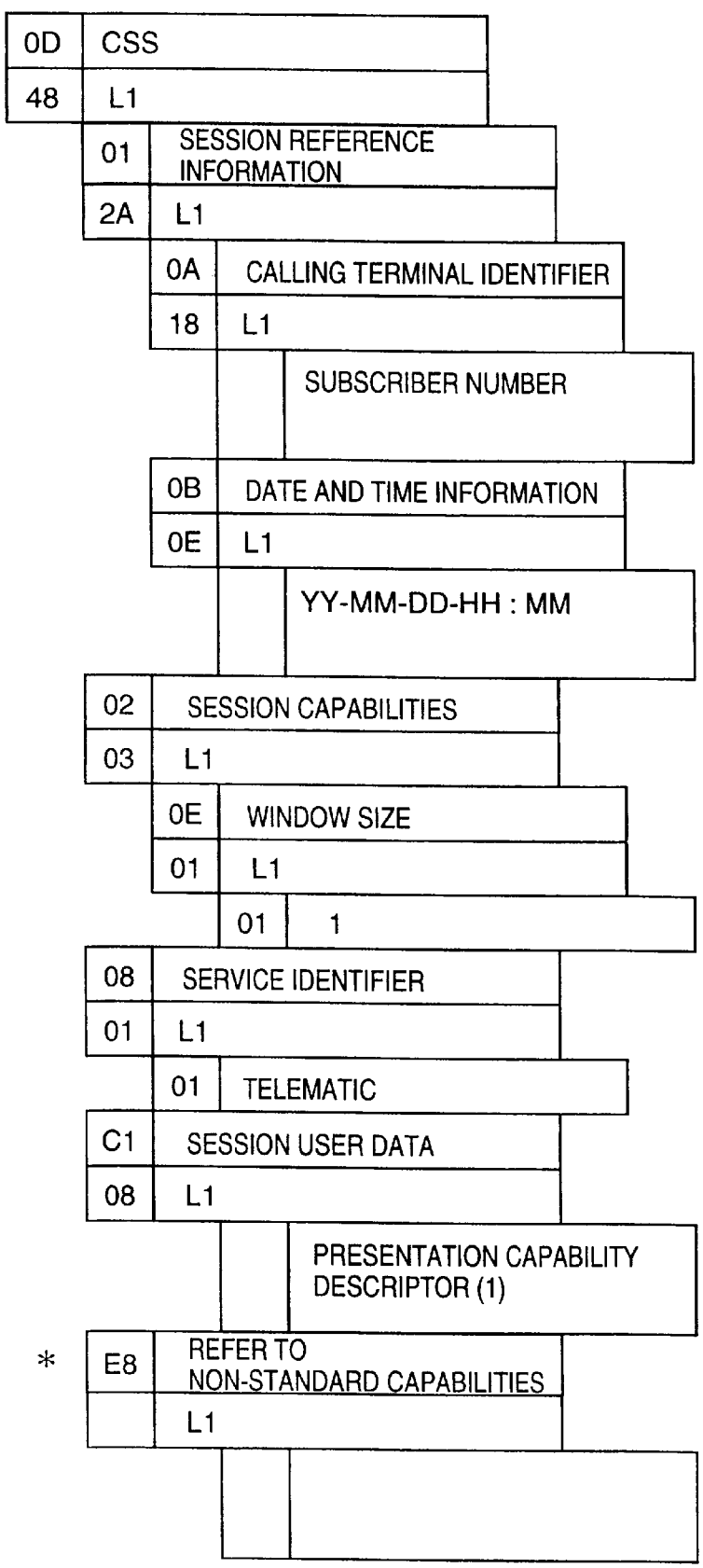
FIG. 18 is an example of a CSS (Command Session Start) command.
Figure 19:
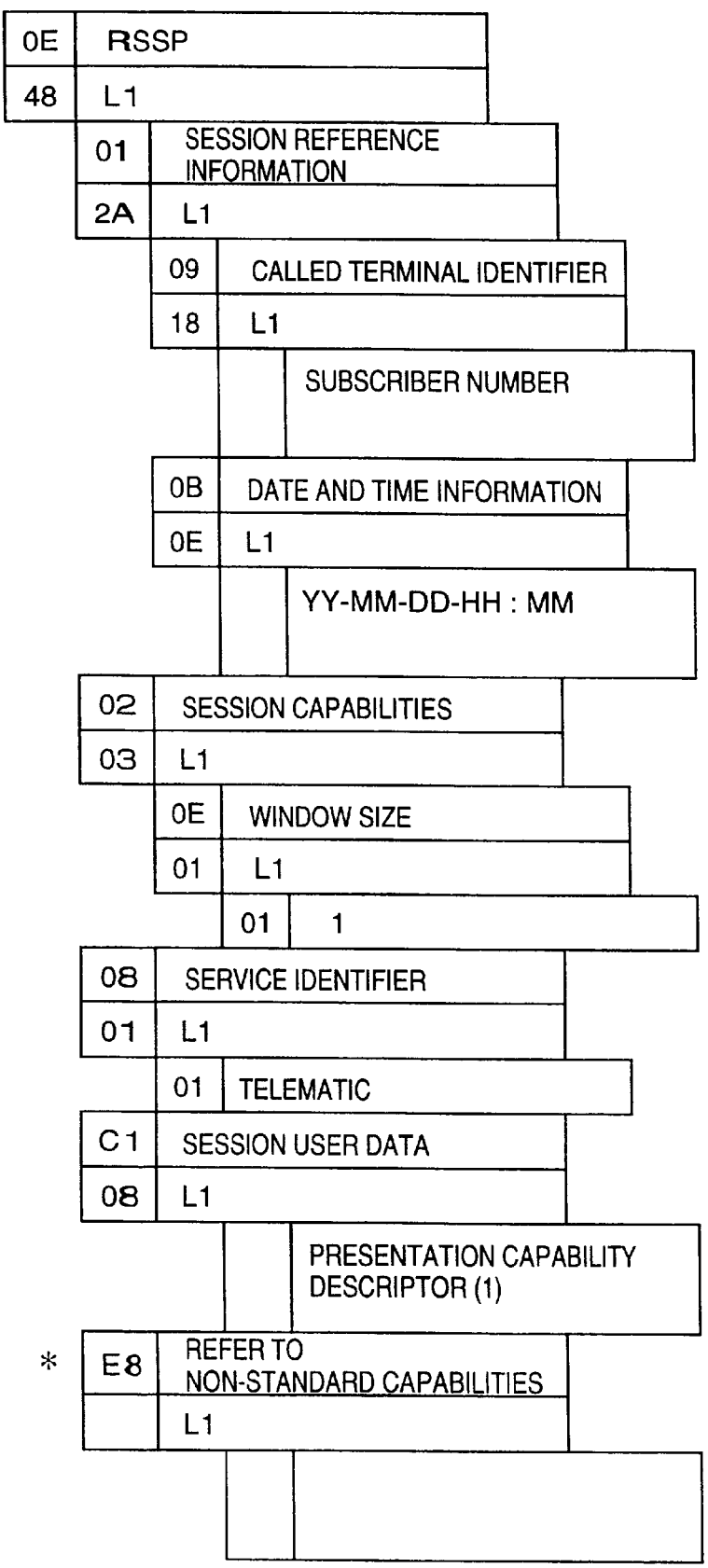
FIG. 19 is an example of an RSSP (Response Session Start Positive) command.
Figure 20:
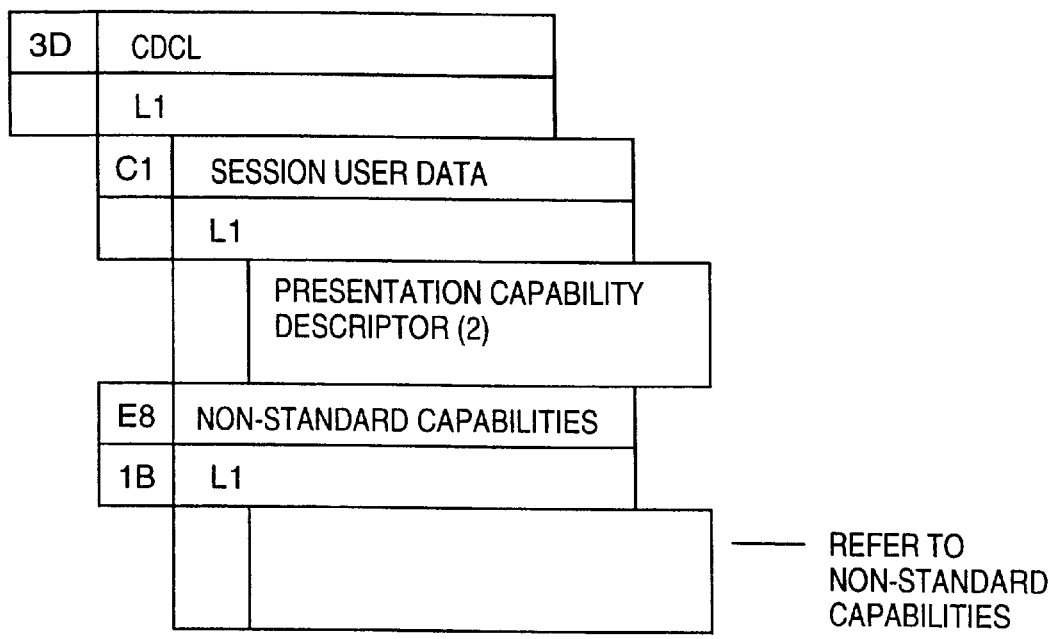
FIG. 20 is an example of a CDCL (Command Document Capability List) command.
Figure 21:
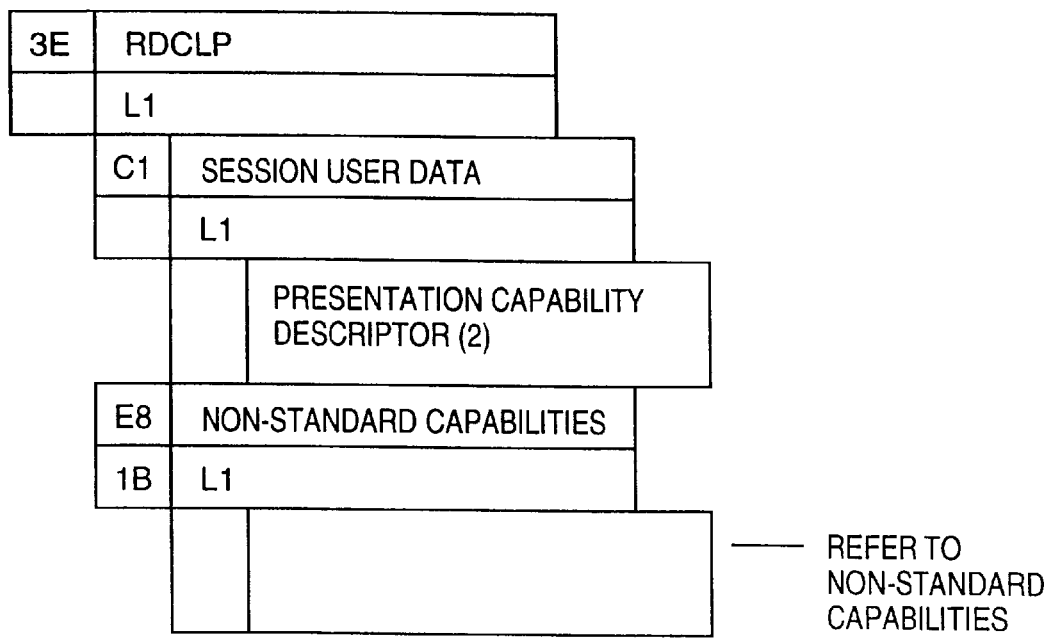
FIG. 21 is an example of a RDCLP (Response Document Capability List Positive) command.

FIG. 16 is a sequence diagram showing a normal G4 facsimile transmission protocol. In G4 facsimile communication, declaration of terminal characteristics and communication negotiation are made by using a CSS (Command Session Start) command as shown in FIG. 18, an RSSP (Response Session Start Positive) command as shown in FIG. 19, a CDCL (Command Document Capability List) command as shown in FIG. 20, and an RDCLP (Response Document Capability List Positive) command as shown in FIG. 21.

Figure 22:
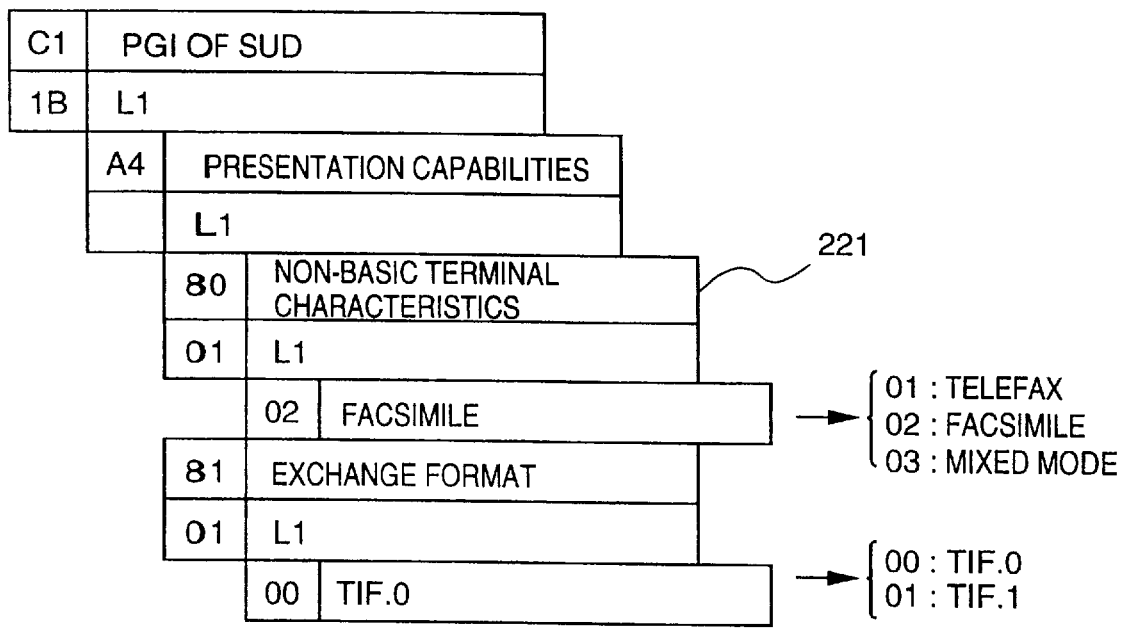
FIG. 22 is an example of presentation capability descriptors (1)
Figure 23:
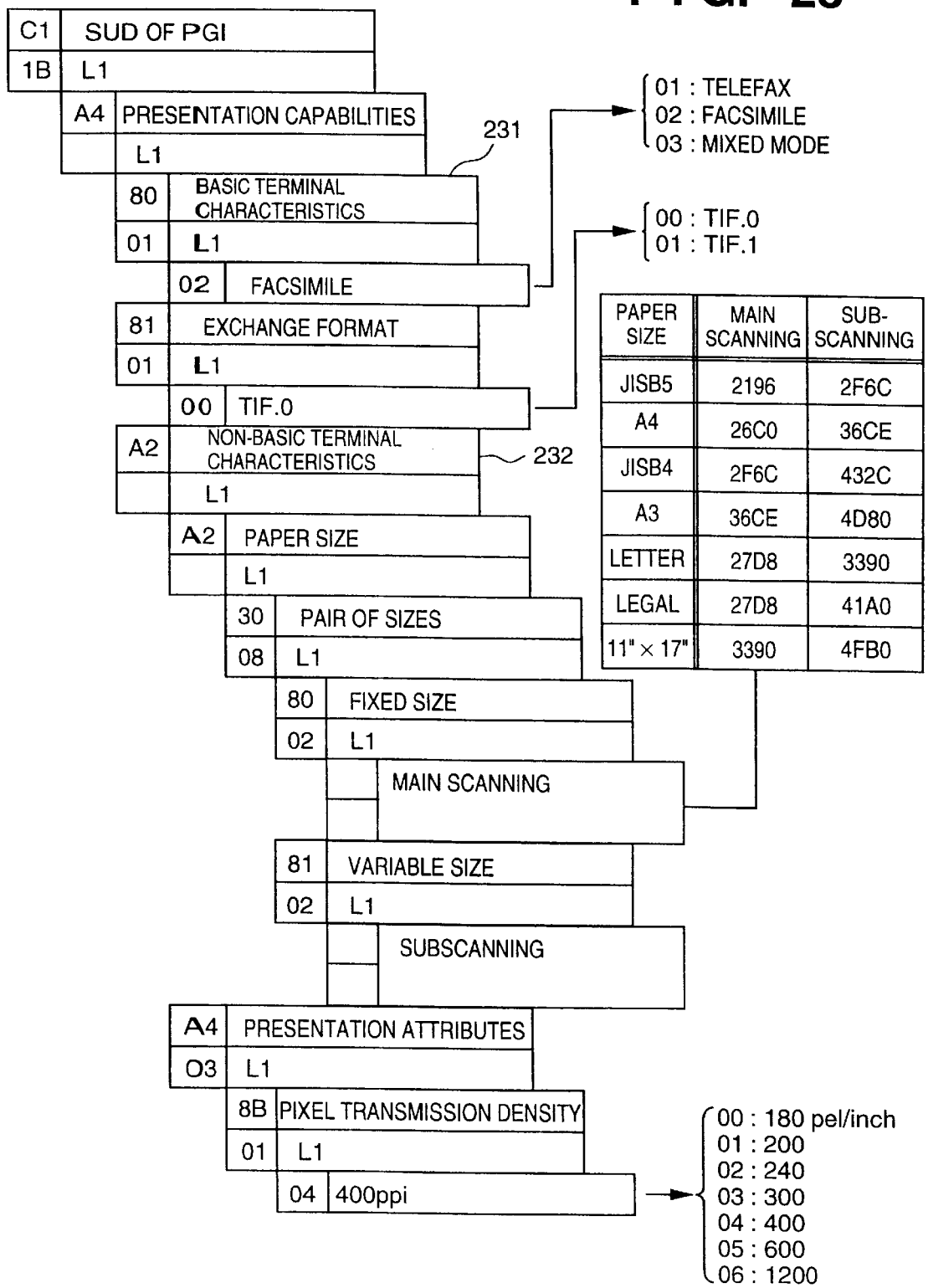
FIG. 23 is an example of presentation capability descriptors (2)
Figure 26:
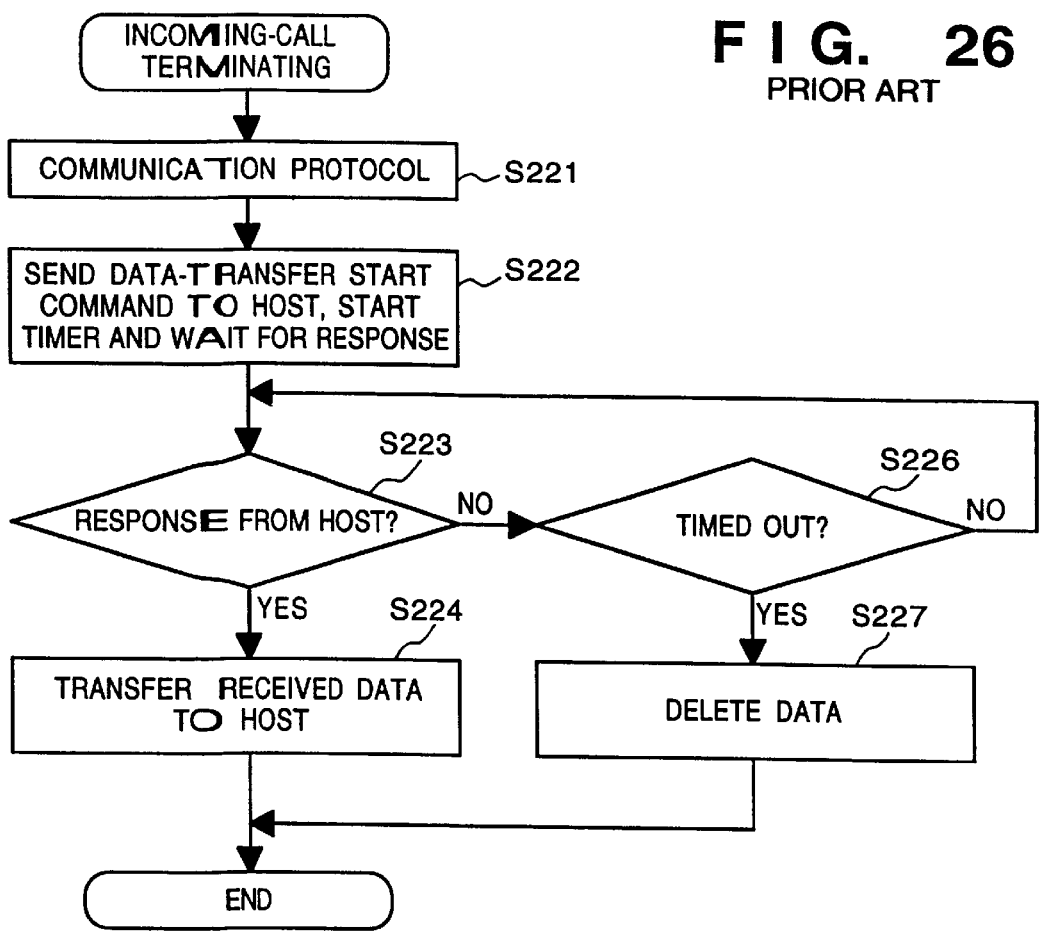
FIG. 26 is a flowchart showing a process procedure of incoming-call processing in a conventional communication system.
Figure 27:
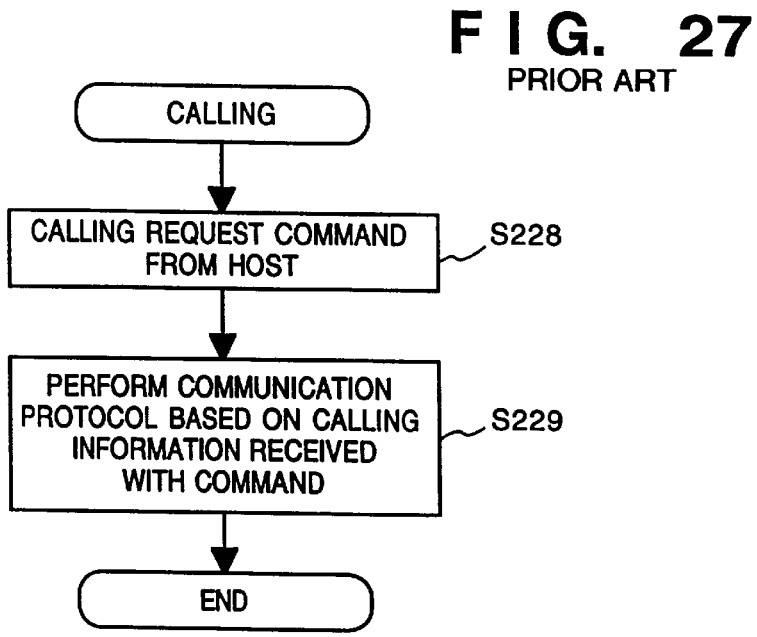
FIG. 27 is a flowchart showing a calling process procedure in the conventional communication system.

Alteration of communication protocol according to the present embodiment is realized by altering the contents of basic terminal characteristics 221 and 231 in presentation capabilities (1) and (2), and non-basic terminal characteristics 232, as shown FIGS. 22 and 23. As set forth, the parameters are changed in accordance with the status of the host 8.

More specifically, if the communication terminal 10 does not connect the host computer 8, as the contents of the "terminal-information" storage area (See FIG. 8) have been copied into the "communication-parameter" storage area (FIG. 6), the parameters for communication which define the basic terminal characteristics and the non-basic terminal characteristics are, respectively, "facsimile", "paper size= A4" and "resolution=200 dpi". The communication terminal 10 changes the contents of the presentation capabilities based on the communication parameters, whereby it operates as a stand-alone apparatus, and comes to process received data within the terminal.

Figure 4:
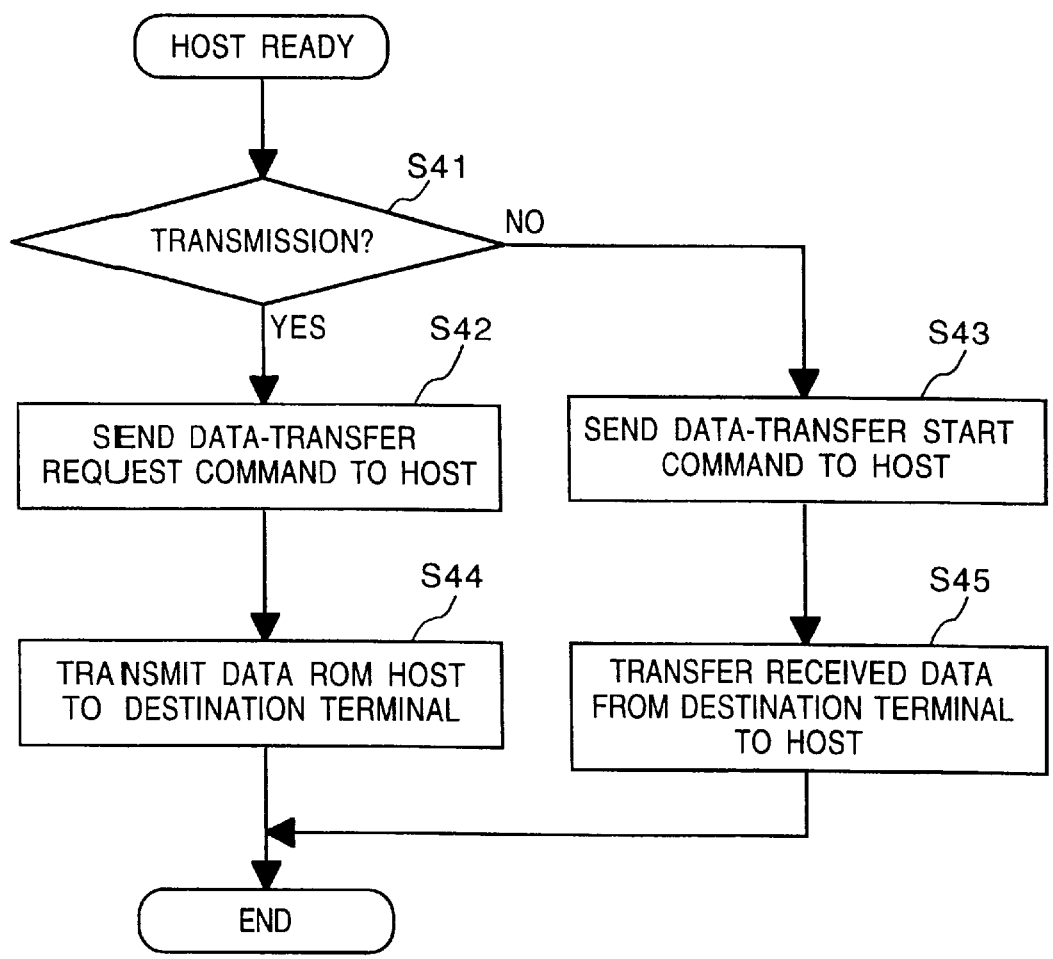
FIG. 4 is a flowchart showing a communication process procedure by the communication terminal when a host computer is ready and operable.

If the communication terminal 10 connects the host computer 8 and the host computer 8 is in ready status, the host computer 8 will operate in accordance with the process procedure as shown in FIG. 4. In this case, as the contents of the host status information (FIG. 11) have been copied in the communication parameter storage area as described above, the copied parameters are, respectively, "mixed mode", "paper size=A3", and "resolution=400 dpi", and, responsively the contents of the presentation descriptors are changed based on the contents of the communication parameters.

FIG. 4 is a flowchart showing a communication process procedure by the communication terminal 10 for a case where the host computer 8 is operable, that is, where the host computer 8 is in ready status. In a case of data reception from a communication-destination terminal (NO at step S41), the communication terminal 10 sends a data-transfer start command (See FIG. 14) to the host computer 8 (step S43), and transfers the data received from the communication-destination terminal to the host computer 8 by a data-transfer frame (See FIG. 13) (step S45).

Further, according to the present embodiment, when the host status (FIG. 11) is indicative of the presence of a stored document in the host computer, that is "01: stored document exists", polling transmission is possible in correspondence with requirement of the communication-destination terminal. The polling transmission will be described with reference to the flowchart of FIG. 17.

Figure 17:
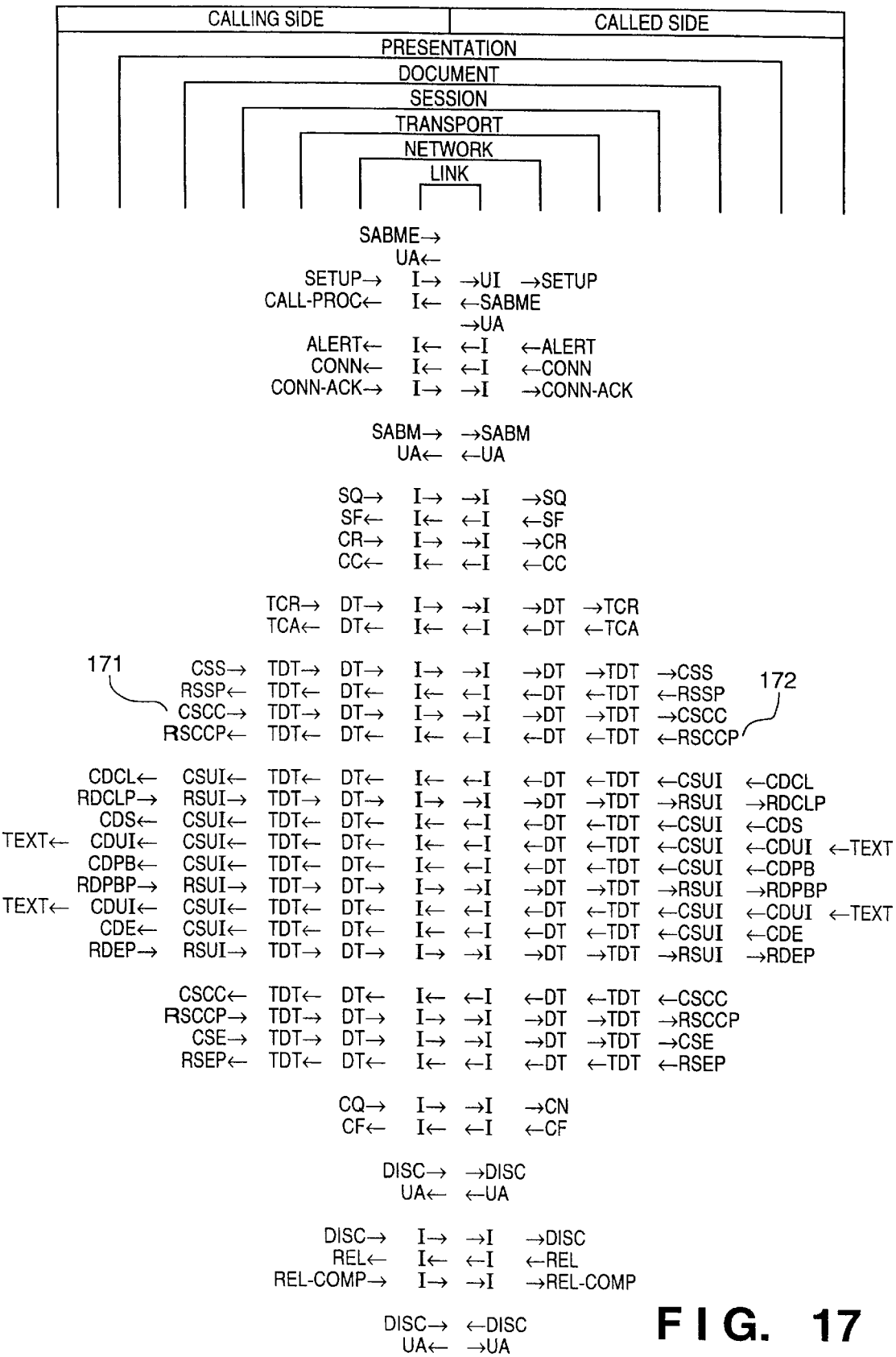
FIG. 17 is a sequence diagram showing a G4 facsimile polling protocol.

FIG. 17 shows a G4 facsimile polling procedure. In FIG. 17, the calling side sends a CSCC command (171) requiring to inverse the session. On the called side, if document to be transmitted to the calling side exists, the called side sends an RSCCP command (172) accepting the inverse of the session. Note that the structures of the CSCC and RSCCP commands are as shown in FIGS. 24 and 25.

On the other hand, referring to FIG. 4, in a case that data transmission to the communication-destination (receiving-side) terminal is being performed (YES at step S41), the communication terminal 10 sends a data-transfer request command (See FIG. 12) to the host computer 8 (step S42). When a data transfer from the host computer 8 is started, the communication terminal 10 transmits the data received from the host computer 8 to the communication-destination terminal (step S44).

Figure 13:
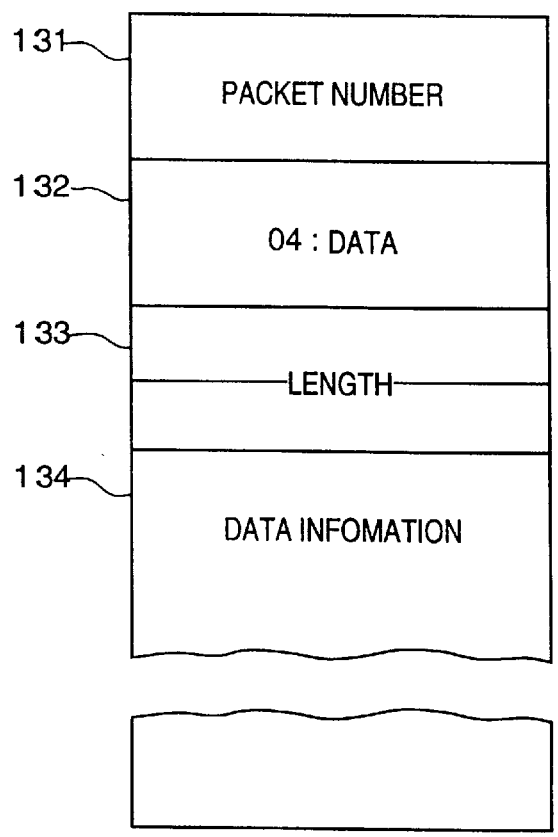
FIG. 13 is an example of the structure of a data transfer frame.

FIG. 13 illustrates the format of a data transfer frame which is transmitted in step 44 of FIG. 4 and received in step 45, and which carries information such as facsimile transmission data. The frame is transmitted from the destination terminal to the communication terminal 10 and then transferred to the host computer 10. In FIG. 13, field 131 stores the number of the packet, and field 132 stores the type of information included in this frame packet (where "04" indicates data information such as facsimile image data). Field 133 stores the length of the packet, and field 134 stores the actual data information (here, facsimile image data).

Figure 5:
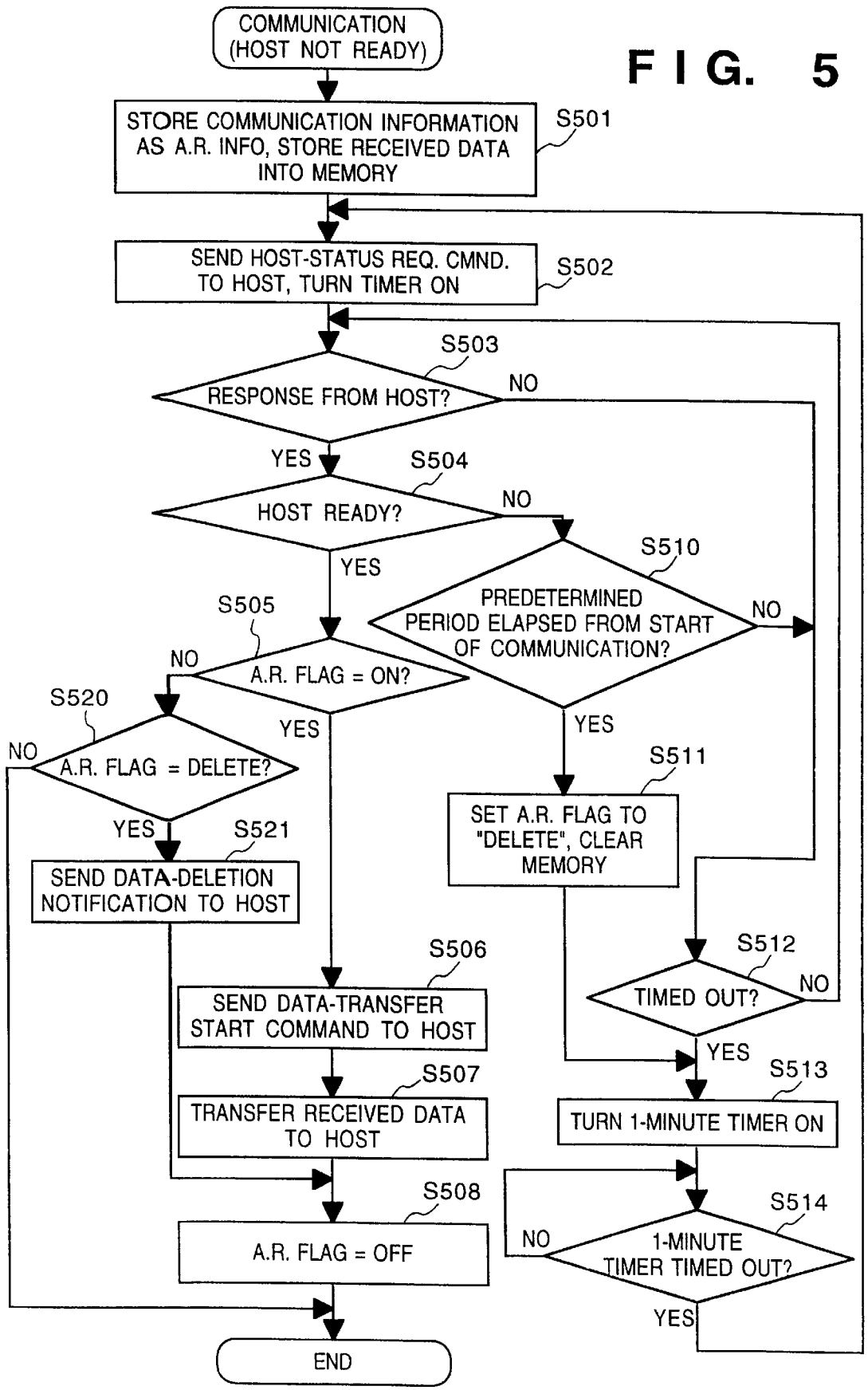
FIG. 5 is a flowchart showing a communication process procedure by the communication terminal when the host computer does not operate.

FIG. 5 is a flowchart showing a communication process procedure by the communication terminal 10 when the host computer 8 is not operable (not ready).

As described above, in a case where the host computer 8 was in busy status but it will become operable, the contents of the "default host-information" storage area, which, upon starting the host computer 8, are copied into the "communication parameter" storage area. See step S39 of FIG. 3A. Then, the communication terminal 10 performs communication as if the host computer 8 is in ready status. Actually, the host computer 8 cannot execute the communication application program, accordingly, the communication terminal 10 stores communication information such as storing time including communication-start time (92), communication type (93), paper size (94) and resolution (95), as shown in FIG. 9, which are alternative reception information (step S501 in FIG. 5). "Alternative reception" is abbreviated into "A. R." in the flowchart of FIG. 5.

After the terminal 10 completes the communication with the communication-destination terminal, it sends a host-status request command to the host computer 8 and starts a response timer (step S502). A response from the host computer 8 is waited for (at step S503). If no response has been received from the host computer 8 until the response timer has timed out (YES at S512), the communication terminal 10 starts a 1-minute timer (step S513).

Upon a time out of the 1-minute timer (YES at step S514), the control returns to step S502 to re-confirm the status of the host computer 8. In a case where a response from the host computer 8 has been received (YES at S503) and it is confirmed that the host computer 8 becomes operable (YES at step S504), the communication terminal 10 confirms whether or not the alternative-reception flag (91 in FIG. 9) has been set to on (step S505). If the flag is on, the communication terminal 10 sends the data-transfer start command to the host computer 8 (step S506). Then, received data which has been already stored in the communication memory 3 at step S501 and the alternative-reception information are transferred to the host computer 8 (step S507). After the data transfer has been completed, the alternative-reception information and the communication memory 3 are cleared (step S508).

On the other hand, in a case where a response from the host computer 8 has been received but the host computer 8 is not in ready status (NO at step S504), the communication terminal 10 then waits the control thus proceeds to step S510 to wait a predetermined time period until the host computer 8 reaches ready status. If the host computer 8 does not reach ready status after the predetermined period has elapsed (YES at step S510), the data stored in the communication memory 3 is deleted or discarded, and the alternative-reception flag (91 in FIG. 9) is set to "deleted" status (step S511).

At step S504, the control waits until the host computer 8 becomes in ready status. After it is confirmed that the host computer 8 becomes in ready status, the terminal 10 determines whether or not the alternative-reception flag is on (Step S505). Since the flag has been set to "deleted" at step S511 as described above, the control advances to step S520 and then to step S521, where the communication terminal 10 sends a data-deletion notification (See FIG. 15) to transfer the alternative-reception information to the host computer 8. Then the communication terminal 10 clears the alternative-reception information and the memory 3, (step S508), and the control ends.

Figure 15:
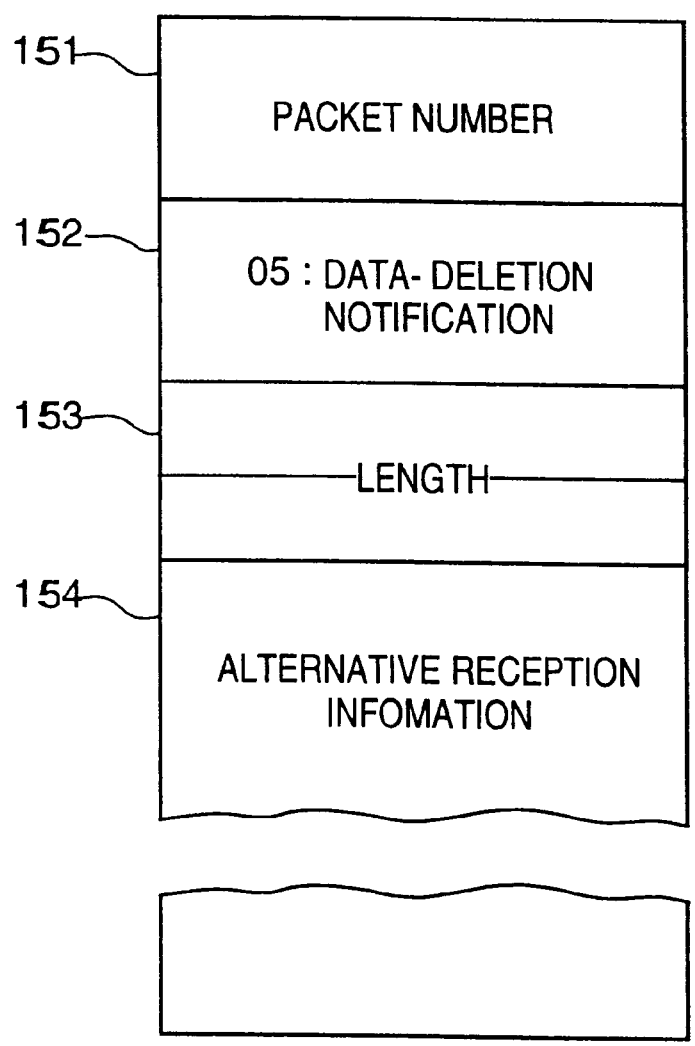
FIG. 15 is an example of the structure of a data deletion notification.

FIG. 15 illustrates a format of a data deletion notification command which is transmitted from the communication terminal 10 to the host computer 8. Field 151 stores a packet number of the notification, while field 152 stores a type of information included in this frame packet. The "05" stored in field 152 indicates that it contains a data deletion notification command. Field 153 stores the length of the packet. Field 154 stores information the terminal 10 alternatively receives.

If the flag has been set to "OFF" (step S520), the control advances to step S505 and then to step S520, and then terminates without performing any process.

As described above, if the communication terminal connects the host computer and the host computer is in ready status, the terminal 10 performs the communication procedure in accordance with the application program of the host computer. If the communication terminal does not connect the host computer, the communication protocol is changed so that the terminal can operate as a stand-alone communication apparatus. This reduces communication errors and enables high-speed and accurate information processing.

Further, in a case where the communication terminal connects the host computer, and the host computer is in busy status due to execution of another application program but there is a possibility that the host computer will become in ready status in a predetermined period, data is received by the communication terminal and transferred to the host computer when the host computer becomes in ready status, so that the data is processed by the host computer. This reduces communication errors and enables high-speed and accurate information processing.

Further, if the host computer does not become in ready status after the predetermined time period, the received data is deleted, which attains effective use of the memory on the communication terminal side. The communication terminal sends communication information on the deleted data to the host computer when it has become in ready status, thus allowing the destination terminal to request for an interrogation and data re-transmission.

Figure 28:
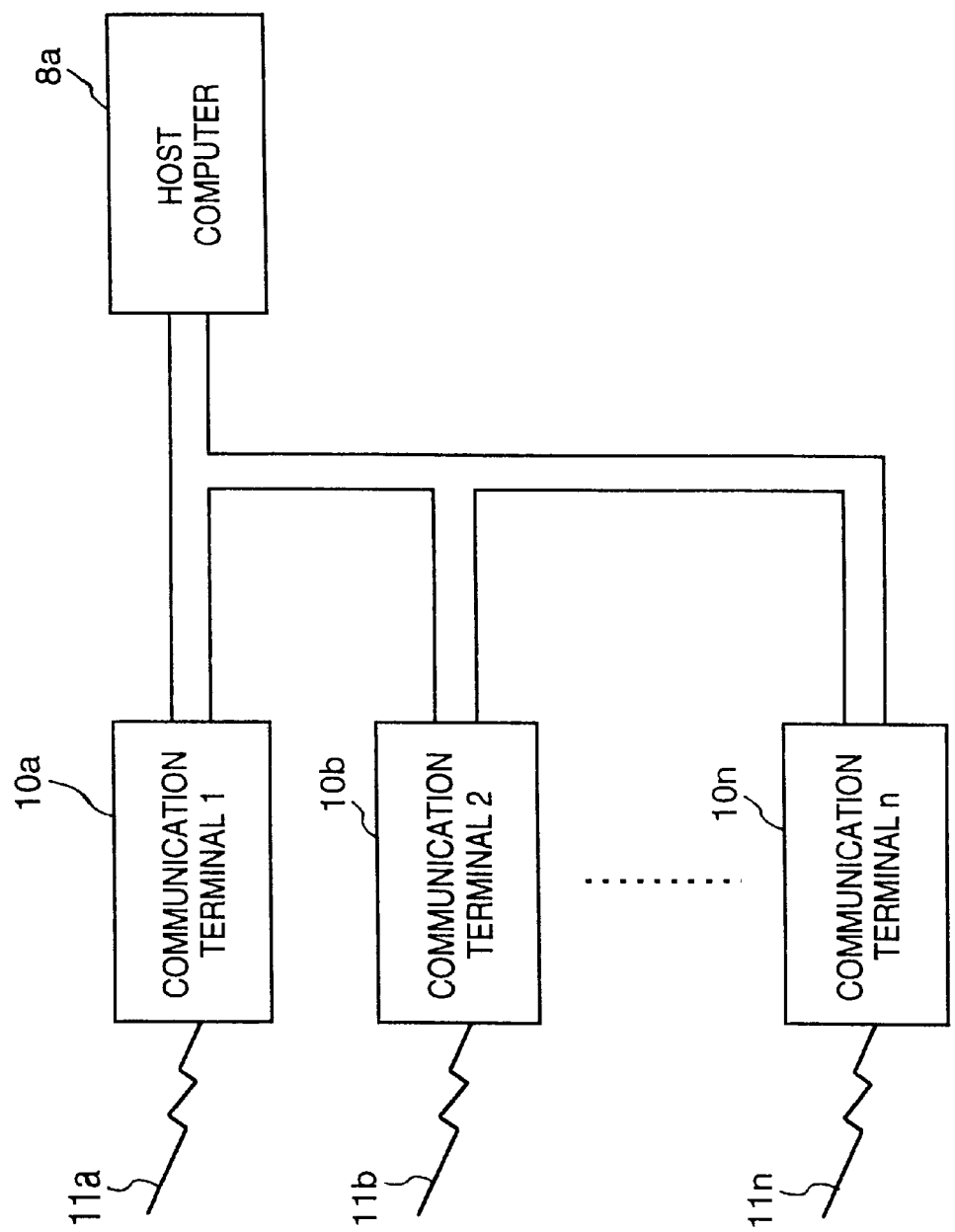
FIG. 28 is a block diagram showing an example of a communication system having a plurality of communication terminals according to the present invention.

Note that the present invention is applicable to a communication system comprising a plurality of communication terminals. FIG. 28 shows a communication system having a number (n) of communication terminals 10 (10*a* to 10*n*). The communication terminals 10*a* to 10*n* respectively confirm the operative connection with a host computer 8*a*. If they connect the host computer 8*a*, they receive operation information of the host computer 8*a*. The communication terminals 10*a* to 10*n* respectively change communication protocols for communication with communication-destination terminals via respective communication lines 11*a* to 11*n*, in accordance with the connection status with the host computer 8*a* and the operation information received from the host computer 8*a*.

The object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus which is connectable to an external device and which communicates with a destination device via a communication line, in accordance with a predetermined communication protocol under which transmission data is transmitted between said communication apparatus and said destination device for visualization, said communication apparatus comprising:

a connection confirmer, arranged to confirm a connection between said communication apparatus and the external device;

an operability acquirer, arranged to acquire operation information of the external device if said connection confirmer confirms the connection between said communication apparatus and the external device;

a controller, arranged to change the communication protocol in accordance with a status of the connection and/or the operation information received by said operability acquirer;

a receiver, arranged to receive the transmission data from the destination device based on the communication protocol controlled by said controller; and a data transferor, arranged to transfer the transmission data received by said receiver and time information regarding a reception time of the transmission data to the external device in accordance with the status of the connection and/or the operation information received by said operability acquirer.

2. The communication apparatus according to claim 1, wherein said controller changes a communication parameter which defines a characteristic of the protocol.

3. The communication apparatus according to claim 1, wherein said protocol includes a negotiation procedure with the destination device, and the controller changes the negotiation procedure.

4. The communication apparatus according to claim 1, wherein said operability acquirer receives the operation information including ready information indicating whether or not said external device is ready for operation from said external device, and wherein if it is determined based on the ready information that said external device is operable, said communication apparatus does not change the communication protocol to perform a communication in accordance with a communication application program that said external device currently executes.

5. The communication apparatus according to claim 1, wherein said operability acquirer receives the operation information including ready information indicating whether or not said external device is operable from said external device, and wherein if it is determined based on the read information that said external device is not operable, said controller changes the communication protocol.

6. The communication apparatus according to claim 5, further comprising:

an operability determiner, arranged to determine, if said external device is not operable, determining whether or not said external device will become operable in a first predetermined time period; and an alternate receiver, arranged to perform alternative reception instead of the said external device if said operability determiner determines that said external device will become operable in the first predetermined time period, wherein said data transferor transfers data received in the alternative reception to said external device when said external device becomes operable.

7. The communication apparatus according to claim 6, further comprising a deletor, arranged to delete the data received when the data has been transferred to said external device.

8. The communication apparatus according to claim 5, wherein if said connection confirmer confirms that said communication apparatus does not connect said external device, said controller changes the protocol by switching operation information for said protocol to the operation information of said communication apparatus.

9. The communication apparatus according to claim 5, wherein if it is determined that said external device is not operable, said controller changes the protocol by switching operation information for said protocol to operation information of said communication apparatus which has been acquired.

10. The communication apparatus according to claim 9, wherein said operation information of said communication apparatus is acquired during initialization phase.

11. The communication apparatus according to claim 8, wherein said communication apparatus functions as a stand-alone communication apparatus.

12. A communication system including a plurality of communication apparatuses, each said communication apparatus being capable of connecting an external device and communicating with destination devices via communication lines, in accordance with predetermined communication protocols under which transmission data is transmitted between said communication apparatus and the destination device for visualization, said communication system comprising:

a connection confirmer, arranged to confirm a connection between one of said plurality of communication apparatuses and the external device;

an operability acquirer, arranged to acuirer operation information of the external device if said operability confirmer confirms the connection between said one communication apparatus and the external device;

a controller, arranged to change the respective communication protocol between said one communication apparatus and the external device in accordance with a status of the connection and/or the operation information received by said operability acquirer;

a receiver, arranged to receive transmission data from the destination device based on the respective communication protocol controlled by said controller; and a data transferor, arranged to transfer the transmission data received by said receiver, and time information regarding a reception time of the transmission data, to the external device, in accordance with the status of the connection and/or the operation information received by said operability acquirer.

13. The communication apparatus according to claim 12, wherein said controller changes a communication parameter which defines a characteristic of the protocol.

14. The communication apparatus according to claim 12, wherein said protocol includes a negotiation procedure with the destination device, and the controller change the negotiation procedure.

15. The communication system according to claim 12, wherein the operation information includes ready information indicating whether or not said external device is operable, and wherein if the ready information indicates that said external device is operable, said one communication apparatus performs the communication protocol in accordance with a communication application program that said external device currently executes.

16. The communication system according to claim 12 wherein the operation information includes ready information indicating whether or not said external device is operable, and wherein if the ready information indicates that said external device is not operable, said controller changes the communication protocol.

17. The communication apparatus according to claim 12, wherein if said connection confirmer confirms that said communication apparatus does not connect said external device, said control means changes the protocol by switching operation information for said protocol to the operation information of said communication apparatus.

18. The communication apparatus according to claim 12, wherein if it is determined that said external device is not operable, said controller changes the protocol by switching operation information for said protocol to operation information of said communication apparatus which has been acquired.

19. The communication apparatus according to claim 18, wherein said operation information of said communication apparatus is acquired during initialization phase.

20. A communication control method for a communication apparatus which is connectable to an external device and which communicates with a destination device via a communication line, in accordance with a predetermined communication protocol under which transmission data is transmitted between the communication apparatus and the destination device for visualization, said method comprising:

a confirming step of confirming a connection between the communication apparatus and the external device;

an acquisition step of acquiring operation information of the external device if the connection between the communication apparatus and the external device is confirmed at said confirming step;

a control step of changing the communication protocol in accordance with a status of the connection and/or the operation information received at said acquisition step;

a receiving step of receiving the transmission data from the destination device based on the communication protocol controlled at said control step; and a transfer step of transferring the transmission data received at said receiving step, and time information regarding a receiving time of the transmission data, to the external device in accordance with the status of the connection and/or the operation information received at said acquisition step.

21. The communication control method according to claim 20, wherein in said control step a communication parameter which defines a characteristic of the protocol is changed.

22. The communication control method according to claim 20, wherein said protocol includes a negotiation procedure with the destination device, and in the control step the negotiation procedure is changed.

23. The communication control method according to claim 20, wherein the operation information includes ready information indicating whether or not said external device is operable, and wherein if the ready information indicates that said external device is operable, said communication apparatus performs the communication protocol in accordance with a communication application program that said external device can currently execute.

24. The communication control method according to claim 20, wherein the operation information includes ready information indicating whether or not said external device is operable, and wherein if the ready information indicates that said external device is operable, the communication protocol is changed at said control step.

25. The communication control method according to claim 20, further comprising:

a determination step of, if the ready information indicates that said external device is not operable, determining whether or not said external device will become operable in a predetermined time period;

an alternative-reception step of performing alternative reception for said external device if it is determined at said determination step that said external device will become operable in the predetermined period; and a transfer step of transferring data received in the alternative reception to said external device when said external device has become in the ready status.

26. The communication control method according to claim 24, further comprising a deletion step of deleting the data received in the alternative reception if said external device has not become operable in the predetermined time period.

27. The communication control method according to claim 23, wherein if it is confirmed at said confirming step that said communication apparatus does not connect said external device, or the ready information indicates that said external device is not operable, operation information of said communication apparatus is used as the operation information of said external device at said control step.

28. A computer-readable storage medium storing a communication control program for executing a method for a communication apparatus which is connectable to an external device and which communicates with a destination device via a communication line, in accordance with a predetermined communication protocol under which transmission data is transmitted between the communication apparatus and the destination device for visualization, said method comprising:

a confirming step of confirming a connection between the communication apparatus and the external device;

an acquisition step of acquiring operation information of the external device if the connection between the communication apparatus and the external device is confirmed at said confirming step;

a control step of changing the communication protocol in accordance with a status of the connection and/or the operation information received at said acquisition step;

a receiving step of receiving the transmission data from the destination device based on the communication protocol controlled at said control step; and a transfer step of transferring the transmission data received at said receiving step, and time information regarding a receiving time of the transmission data, to the external device in accordance with the status of the connection and/or the operation information received at said acquisition step.

29. The communication apparatus according to claim 1, wherein the communication protocol includes data format information indicative of the transmission data, and said controller changes the communication protocol by changing the data format information in accordance with the status of the connection and/or the operation information received by said operability acquirer.

30. The communication apparatus according to claim 29, wherein the format information comprises information indicative of the size of an image represented by the transmission data which is communicated and is to be visualized.

31. The communication apparatus according to claim 29, wherein the format information comprises information indicative of the resolution of an image represented by the transmission data which is communicated and is to be visualized.

* * * * *

UNITED STATES PATENT AND TRADEMARK OFFICE
CERTIFICATE OF CORRECTION

PATENT NO. : 6,061,149
DATED : May 9, 2000
INVENTOR(S) : YUKO HOSOKAWA ET AL.

It is certified that error appears in the above-identified patent and that said Letters Patent is hereby corrected as shown below:

COLUMN 5

```
Line 37, "If a response from the host computer 8"
    should be deleted.
Line 38, "(YES at step S23), the communication
    terminal" should be deleted.
Line 44, "packet. 10" should read --packet.
    ¶ If a response has been received from the host
        computer 8 (YES at step S23), the communication
        terminal 10--.
```

COLUMN 7

```
Line 10, "summary" should read --summarily--.
```

Signed and Sealed this

Third Day of April, 2001

Attest:

NICHOLAS P. GODICI

*Attesting Officer*   *Acting Director of the United States Patent and Trademark Office*